March 27, 1956 R. H. HIEGER Re. 24,134

CARBURETOR ACCELERATION PUMP

Original Filed Dec. 20, 1948

INVENTOR.
Robert H. Hieger
BY
A R McCrady
ATTORNEY.

United States Patent Office

Re. 24,134
Reissued Mar. 27, 1956

24,134

CARBURETOR ACCELERATION PUMP

Robert H. Hieger, Detroit, Mich.

Original No. 2,633,085, dated March 31, 1953, Serial No. 66,170, December 20, 1948. Application for reissue March 2, 1955, Serial No. 491,801

5 Claims. (Cl. 103—202)

Matter enclosed in heavy brackets [ ] appears in the original patent but forms no part of this reissue specification; matter printed in italics indicates the additions made by reissue.

This invention relates to carburetors for internal combustion engines, and more particularly to pump mechanism for supplying acceleration fuel to the engine for acceleration.

Most commercial carburetors as now constructed include an acceleration pump actuated whenever the throttle is moved toward open position to force a quantity of fuel, additional to that supplied by the main nozzle, from the fuel reservoir into the induction passage of the carburetor. It frequently happens that, due to defects of design or manufacture, the piston of such a pump becomes misaligned relative to its cylinder, so that it does not operate properly, and with continued use the piston packing becomes worn in such manner that the piston bypasses a considerable amount of fuel.

Such defects of the pump mechanism are difficult to detect, since commercial carburetors are so constructed that it is impossible (without apparatus so elaborate as to be commercially impracticable) to measure the quantity and rate of discharge of the pump under various conditions of operation. Also, if defective operation is found or suspected, it is difficult to remedy by means of ordinary shop tools, hence the usual procedure is to return the carburetor to the factory for rebuilding or reconditioning, supplying to the user a new or reconditioned carburetor, at considerable cost to him.

An object of the present invention is to provide a carburetor comprising improved acceleration pump mechanism not subject to the defects above mentioned.

A further object of the invention is to provide acceleration pump mechanism elements which may be readily installed in existing carburetors in replacement of the corresponding elements with which the carburetor is originally equipped.

Further objects and advantages of the invention will be apparent from the following description, taken in connection with the appended drawing, in which.

It is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

Figure 1:
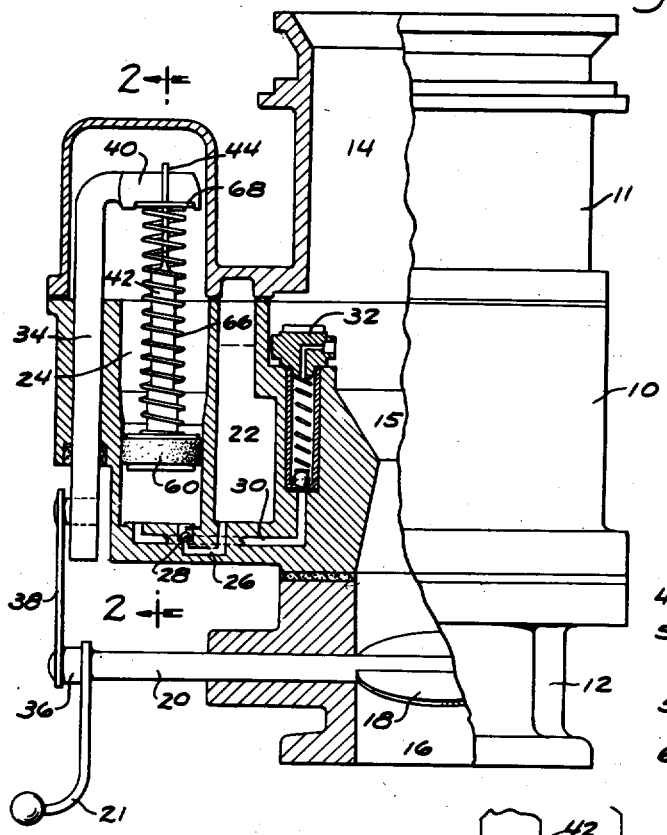
Fig. 1 is a diagrammatic view, partly in section, of a carburetor embodying the present invention.

The carburetor shown in Fig. 1 is of the downdraft type commonly used in automobile engines. The carburetor body may be of any known or suitable construction, but as shown comprises a main body section 10, an air horn section 11, and a throttle body 12. The induction passage of the carubretor comprises an air inlet 14, a venturi 15, and a mixture outlet 16 designed to be connected to the intake manifold of an internal combustion engine, not shown. The induction passage is controlled in the usual manner by a manually operated throttle 18 which is mounted on a shaft 20 and is controlled by a throttle lever 21 connected to the acceleration pedal of the automobile.

Fuel is supplied to the induction passage from a reservoir 22, whence it flows through passages not shown to a main nozzle discharging at the venturi 15. Suitable economizer mechanism, and also choke valve and idling fuel mechanisms, not shown, will ordinarily be included in the carburetor. The structure thus far described is old.

The acceleration pump comprises a cylinder 24 formed in the main body section 10. In the example shown, the lower or pumping portion of the cylinder is of smaller diameter than the upper portion, the two portions being joined by a frusto-conical section; but the cylinder may be of true cylindrical form if desired. At the bottom of the cylinder an inlet passage 26 controlled by a check valve 28 connects it with the reservoir 22. An outlet passage 30 leads from the pump cylinder to a discharge nozzle 32, which may be of the type disclosed in the copending application of Hieger and Keller, Serial Number 47,385, filed September 2, 1948, now abandoned.

The movable mechanism of the acceleration pump comprises a vertically reciprocable rod 34 which passes through a vertical slot in main body section 10 and is connected to the throttle shaft 20 by a lever 36 and a link 38, so that upon opening movement of the throttle the rod 34 will be moved downwardly to actuate the pump in known manner. The upper end of the rod 34 is formed with a horizontal arm 40 which extends above the cylinder 24. This represents a commonly used type of actuating mechanism; for other types used in commercial carburetors the piston mechanism described hereinafter may be modified where necessary.

The piston mechanism comprises a piston rod 42 having a slotted upper end 44 which fits slidably over the arm 40, and a reduced lower end 46 forming a shoulder 47. The end 46 fits loosely in an aperture 48 formed by the inturned upper edges of a sleeve 49. The end 46 is secured to the sleeve 49 by a collar 50 which is press-fitted thereon at such distance from the shoulder 47 as to provide an annular groove in which the sleeve 49 fits with such clearance as to permit rocking and rotary movement of the sleeve relative to the piston rod 42. Said rocking movement is further facilitated by the loose fit of end 46 in the aperture 48, and by the fact that the upper surface of collar 50 is of rounded or part-spherical contour as shown. The connection between piston rod 42 and sleeve 49 may be said to be a universal coupling as well as a swivel.

Figure 2:
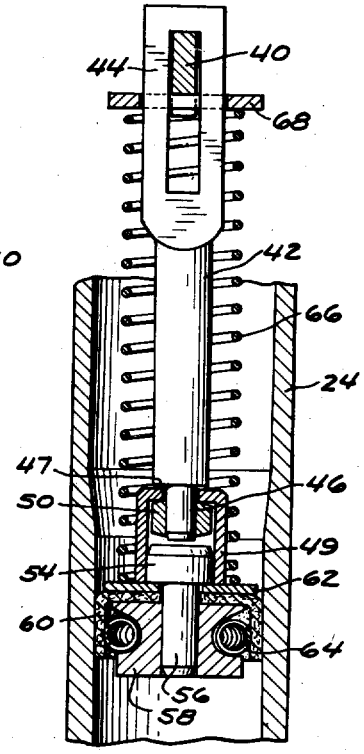
Fig. 2 is an enlarged sectional view of the pump piston and its associated parts, taken on the line 2—2 of Fig. 1.
Figure 3:
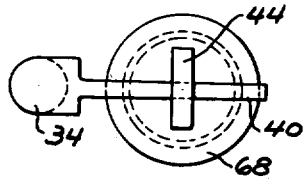
Fig. 3 is a plan view of the mechanism shown in Fig. 2.
Figure 4:
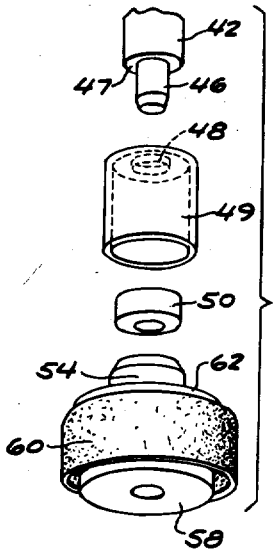
Fig. 4 is an exploded view of the piston and its associated parts.

*It will now be seen from an examination of Fig. 2 that because of such a construction, there may also be in the embodiment illustrated limited relative movements between the piston rod and the piston body longitudinally of the axis thereof. Such relative longitudinal or axial movements in the embodiment illustrated are movements resulting from the construction provided therein to produce the required rocking and rotation of the piston assembly on the rod, and not vice versa, as sometimes may be the case when provision of the axial movement to produce the extended duration of the piston travel is the prime purpose of the connection between the piston rod and the piston body, such as shown, for instance, in the U. S. Patent No. 2,212,946 to Mock et al. It should also be noted from examination of Fig. 2 that rounding of the mating parts, as shown in said drawing and explained above, makes such axial movement very small.*

The sleeve 49 is press-fitted to the enlarged upper end 54 of a stud which is received therein. The lower end 56 of the stud is press-fitted in an axial bore in a piston head 58. A gasket 60 of leather or similar material is retained between the piston head 58 and a washer 62, which is interposed between the stud 54—56 and the piston head 58. The outer edge of the gasket extends downwardly as shown and is held in contact with cylinder 24 by a toroidal spring 64 in known manner.

In assembling the members just described, the washer 62 and gasket 60 are placed on the stud end 56, and the piston head 58 carrying spring 64 is pressed thereon. The sleeve 49 is placed on piston rod end 46, and collar 50 is pressed thereon to retain the same loosely in position. The stud end 54 is then press-fitted to sleeve 49. A compression spring 66 is then placed over piston rod 42 and held in place by a washer 68, and the upper end of the piston rod is slipped over arm 40 to complete the assembly.

It will be understood that although press-fitting is the preferred manner of securing the parts 46 and 50, 49 and 54, and 56 and 58 to each other they may be secured together in other known manner if desired.

In operation, the pump functions in the usual manner, fuel being drawn into the pump chamber through passage 26 on the upstroke of the pump. If the throttle 18 is suddenly opened, arm 20 is moved rapidly downwardly, compressing spring 66, which in turn moves the piston mechanism downwardly at a somewhat slower rate, giving a sustained discharge of fuel through the discharge nozzle 32. By reason of the universal and swivel connection between piston rod 42 and the piston head the piston can adjust itself to any irregularities in the alignment of the parts, or to any deviations from the usual manufacturing tolerances, and still function without binding or unnecessary friction.

In installing the piston mechanism as a replacement for the piston mechanism in known types of carburetors, the air horn section 11 is removed, the original mechanism replaced by the mechanism herein described, and the air horn section replaced.

*It will now be appreciated in view of the foregoing that the present invention is directed particularly to carburetor acceleration pumps including piston rods in which increased or extended duration of the downward movement of the piston is produced by the construction of the top of the piston rod, such as by providing a slot in the top of the piston rod, in which slot the end of the push rod is made to slide, as shown in the drawings. The present invention is not directed to acceleration pumps in which such extended duration of piston travel is produced by the connection between the bottom of the piston rod and the piston body to permit the rod to slide into and out of the piston body for the required relatively large distance, such for instance, as shown in the above mentioned Patent No. 2,212,946, wherein such a connection is provided expressly for the purpose of producing such extended duration of piston travel by sliding of the rod into and out of the piston for a considerable distance required for such purpose. Such sliding is not necessary or desired for the purpose of the present invention. On the other hand, universal and swivel movements produced in the present construction as mentioned above and necessary for the purpose of the present invention, have no bearing or effect on the duration of the downward travel of the piston, and are neither equivalent nor a substitute therefor.*

Although the invention has been described with reference to a particular embodiment thereof, it may be embodied in other forms within the skill of artisans in this art, and is not limited except in accordance with the terms of the following claims.

I claim:

1. Acceleration pump mechanism for a carburetor, said mechanism comprising a pump cylinder having walls made of die cast metal, a piston assembly slidably fitted therein; a piston rod *having an upper end and a lower end, means in said upper end of the piston rod to provide for extended duration of the downward movement of the piston assembly;* a connection between said piston assembly and said rod *at the lower end thereof,* said connection providing for *limited axial lost motion between said piston assembly and the rod and lateral movement sufficient to provide for* [limited axial lost motion between said piston assembly on the rod and lateral movement to provide for] rocking of said piston assembly on said rod and free rotation of said piston assembly on the rod through 360 degrees, *but not to provide for prolonged duration of piston travel* said piston assembly including a metal piston head and a flanged non-metallic yielding gasket operatively arranged on said head and adapted to prevent any metal-to-metal contact between said head and the cylinder walls and adapted to exert less pressure on cylinder walls during its suction stroke than on its pumping stroke.

2. The construction defined in claim 1, with the piston assembly thereof including a metal washer arranged over said gasket to hold the same against the piston head, said washer having an outside diameter sufficiently smaller than that of the cylinder to prevent its contact with the cylinder walls in any operative position of the piston assembly.

3. The construction defined in claim 1, with the piston assembly thereof including a metal washer arranged over said gasket to hold the same against the piston head, said washer having an outside diameter sufficiently smaller than that of the cylinder to prevent its contact with the cylinder walls in any operative position of the piston assembly, and a stud having a stem pressed into the piston head and a head holding said washer against the gasket.

4. The construction defined in claim 1, with the piston assembly thereof including a metal washer arranged over said gasket to hold the same against the piston head, said washer having an outside diameter sufficiently smaller than that of the cylinder to prevent its contact with the cylinder walls in any operative position of the piston assembly, and a cup having its open end pressed fitted over the head of said stud and provided with a hole in its closed end adapted to be connected to the piston rod end, with said end having diameter sufficiently smaller than the diameter of said hole to provide for rocking of the cap thereon.

5. Acceleration pump mechanism for a carburetor, said mechanism comprising a pump cylinder having metal walls, a piston assembly slidably fitted therein; a piston rod; a connection between said piston assembly and said rod, said connection providing for *limited axial and lateral lost motion between said piston assembly and said rod to provide for* [limited axial and lateral lost motion between said piston assembly and said rod to provide for] rocking of said piston assembly on the rod and free rotation of said piston assembly on the rod through 360 degrees, said piston assembly including a metal piston head and a flanged non-metallic yielding gasket operatively arranged on said head and adapted to prevent any metal-to-metal contact between said head and the cylinder walls and adapted to exert less pressure on cylinder walls during its suction stroke than on its pumping stroke; said rod having a slotted upper end adapted to receive a pump-actuating member and providing for axial lost motion and relative rocking of said end and said member in two perpendicular directions.

References Cited in the file of this patent or the original patent

UNITED STATES PATENTS

| | | |
|---|---|---|
| 1,455,584 | Graham | May 15, 1923 |
| 1,625,099 | Rudolph | Apr. 19, 1927 |
| 2,048,727 | Boyce | July 28, 1936 |
| 2,080,569 | Holley | May 18, 1937 |
| 2,141,594 | Cole | Dec. 27, 1938 |
| 2,312,819 | Heftler | Mar. 2, 1943 |
| 2,352,410 | Rushmer | June 27, 1944 |

OTHER REFERENCES

Serial No. 418,664, Neugebauer (A. P. C.) published May 25, 1943.